United States Patent [19]

Willmerding

[11] 4,219,317
[45] Aug. 26, 1980

[54] DEVICE FOR PRODUCING HOLLOW MOLDED MEMBERS

[75] Inventor: Günter Willmerding, Inning, Fed. Rep. of Germany

[73] Assignee: Metzeler Kautschuk Aktiengesellschaft, Munich, Fed. Rep. of Germany

[21] Appl. No.: 46,861

[22] Filed: Jun. 8, 1979

[30] Foreign Application Priority Data

Jun. 16, 1978 [DE] Fed. Rep. of Germany ....... 2826340

[51] Int. Cl.² .......................... B29C 5/00; B29H 5/18; B29H 5/02; B29H 17/00; B29F 1/06
[52] U.S. Cl. ..................................... 425/145; 425/546; 425/577
[58] Field of Search ................ 425/145, 546, 577, 435

[56] References Cited

U.S. PATENT DOCUMENTS

| | | | |
|---|---|---|---|
| 3,879,161 | 4/1975 | McGillvary | 425/435 |
| 3,902,836 | 9/1975 | McIntosh | 425/577 X |
| 3,932,088 | 1/1976 | Harada et al. | 425/577 X |

FOREIGN PATENT DOCUMENTS 2156055 5/1973 Fed. Rep. of Germany ...... 425/577 X

*Primary Examiner*—J. Howard Flint, Jr.
*Attorney, Agent, or Firm*—Herbert L. Lerner

[57] ABSTRACT

Production of hollow shaped bodies made of pourable and hardenable material, particularly polyurethane tires, in a mold cavity having a deformable membrane. The membrane is expanded to fill the mold cavity and expel air therein. Thereafter an amount of material required to produce the shaped body is introduced into the mold cavity and concomitantly the membrane is contracted to the form of the core. This minimizes air bubbles in the shaped body. A piston-cylinder unit movable with the inflow and outflow of liquid to the deformable membrane may be used to accurately control feed of polyurethane material to the mold cavity.

4 Claims, 2 Drawing Figures

DEVICE FOR PRODUCING HOLLOW MOLDED MEMBERS

BACKGROUND OF THE INVENTION

1. Field of the Invention

This invention relates to an apparatus for the manufacture of shaped hollow bodies made of material capable of being poured (cast) and hardened in a hollow mold whose core is provided with an elastic membrane.

Though this method can be used for the manufacture of hollow bodies of any shape, in the following the method is explained with particular reference to the manufacture of air tires made of polyurethane. Thereby, either the casings (carcasses) alone are made of polyurethane, or the casing and the contact area of the tire are simultaneously made of polyurethane in the so-called "Injection-method".

2. Description of the Prior Art

In the manufacture of tires, the pouring of the casing without bubbles is a great problem i.e. the pouring process must be done in such a manner that air-filled inclusions will not occur.

This exclusion of bubbles could, up to now, be achieved only by using relatively complicated, costly methods.

It has been suggested to evacuate the die cavity before filling in the cavity with polyurethane. However, this requires that the cavity be very well sealed, so that no air can re-enter the cavity until the pouring process is ended. Such a well-sealed die cavity results in a very high tooling cost. Furthermore, the seal is susceptible to distortions which cannot be avoided due to the repeated heating and cooling of the form. The seal is also subject to shock and vibration which also makes it difficult to maintain tightness.

From the German Published Non-Prosecuted Application 2,231,780 for the manufacture of air-tires, it is known to carry out the pouring process while rotating the mold (die form) at the same time. Due to the generated centrifugal forces, a pressure field is created within the poured material so that air bubbles can quickly and reliably escape to the outside and the finished air tire is practically without bubbles. This method also requires high construction costs, because the die and its bearing supports must be very massively constructed due to the relative high centrifugal forces which occur at a rotation number of two revolutions per second.

In principle the possibility exists of filling the die cavity as slowly as possible, and thereby keeping the viscosity of the material which is to be cast and hardened as low as possible. Then the air due to its buoyancy, can slowly escape in the form of bubbles from the cavity. This procedure requires very long reaction times of the material being poured, and an uneconomical long time until the mold can be opened, both of which are unfavorable factors with respect to the manufacturing cost of the tire. Furthermore, for this method only certain polyurethane materials can be used, so that the choice of starting materials is narrow.

SUMMARY OF THE INVENTION

An object of the present invention is to provide an apparatus for the manufacture of shaped hollow bodies made of a material which is capable of being poured and hardened to efficiently and economically produce a finished shaped body which is substantially free of air bubbles.

With the foregoing and other objects in view, there is provided in accordance with the invention, an apparatus for carrying out the method for the production of hollow shaped bodies made of pourable and hardenable material in a mold cavity which comprises, disposing a core with a deformable membrane, into the mold cavity before introducing said material, expanding the membrane to a volume that substantially fills the mold cavity and expels gas contained therein, thereafter introducing into the mold cavity an amount of hardenable material corresponding to amount of material required to produce the shaped body, and concomitantly contracting the membrane to the form of the core, thereby minimizing the inclusion of air in the shaped body.

In accordance with the invention, there is provided an apparatus for production of hollow shaped bodies made of pourable and hardenable material in a mold cavity and minimizing the inclusion of air in the shaped body which comprises, a mold having a mold cavity, a core with a deformable membrane disposed in the mold cavity, a conduit leading to the deformable membrane for the introduction of a liquid medium under superatmospheric pressure, which liquid expands the membrane to a volume that substantially fills the mold cavity and expels gas contained therein, an opening to the mold cavity for the introduction of hardenable material corresponding to the amount of material required to produce the shaped body, at a superatmospheric pressure above the pressure of the liquid in the membrane to effect contraction of the membrane to the form of the core, and a piston-cylinder unit connected to the conduit for the transfer of the liquid medium into and out of the mold cavity.

Other features which are considered as characteristic for the invention are set forth in the appended claims.

Although the invention is illustrated and described herein as embodied in a device for performing the method, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
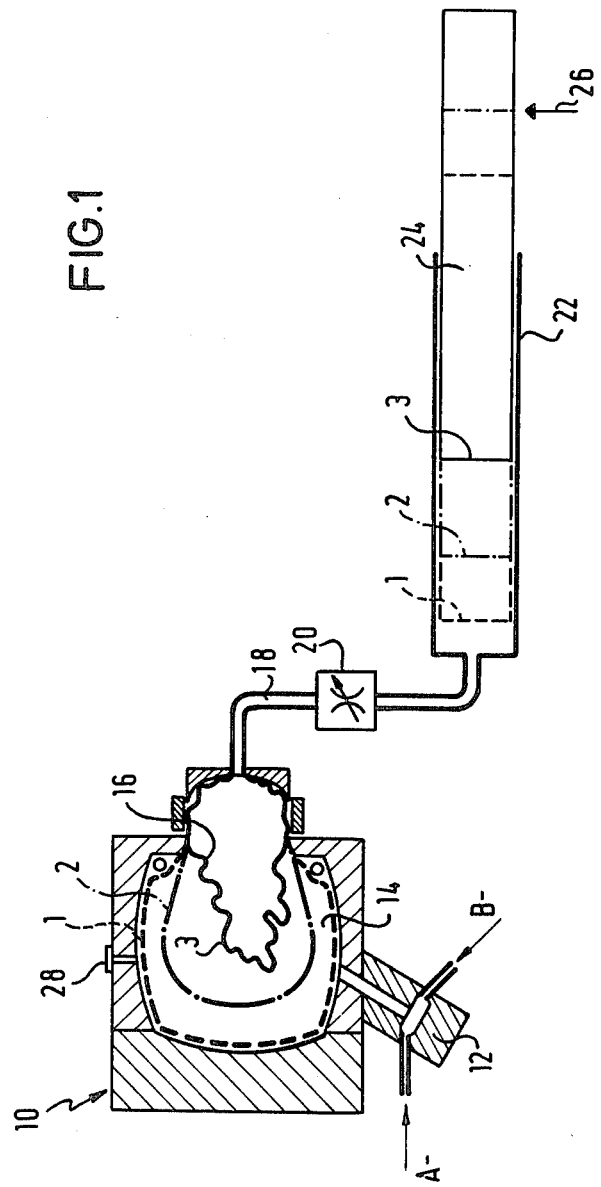
FIG. 1 diagrammatically illustrates a section through a device in accordance with the invention for the production of air-tires, wherein the core is formed by the membrane only.

In accordance with the invention, the production of hollow shaped bodies made of pourable and hardenable material is in a mold cavity whose core is provided with a deformable membrane. Before introducing the material, the membrane is expanded to a volume that fills the mold cavity. Thereafter, an amount of hardenable material, corresponding to the shaped body to be produced, is filled into the mold cavity, whereby the membrane contracts to the form of the core. Apparatus for performing the method may include a piston-cylinder unit connected to the membrane, to introduce the liquid medium into the membrane.

The advantages effected by the invention are based on the following manner of operation: Before introducing the pourable, hardenable material into the mold cavity a membrane is expanded to a volume which substantially fills the die cavity. Thereby the air in the cavity is expelled or displaced through an opening in the wall of the cavity which can be closed, so that a practically "evacuated" die cavity is produced, i.e. a die cavity filled only by the membrane.

After closing the discharge opening for the air, the material to be poured which is capable of hardening, is filled into the die cavity, and displaces the membrane. Because of its incompressibility, i.e. the membrane shrinks corresponding to the quantity of liquid material introduced without any significant amount of air entering the die cavity.

After an amount of material corresponding to the shaped body to be manufactured has been poured, the filling process is interrupted. The material now is hardening and thereafter the hardened material is taken out of the mold after the core has been removed.

With respect to the construction of the core, two embodiments are illustrated:

The core can be formed by the elastic (deformable) membrane containing only a suitable liquid whose specific weight or specific gravity corresponds to the specific weight or specific gravity of the hardenable material to be poured. After pouring the total amount of material corresponding to the shaped body which is to be produced, the outer surface of the membrane corresponds in this case exactly to the inner contour of the shaped-body, for example to the inner contour of the tire casing.

After hardening of the material, the liquid is pumped out of the membrane, so that the collapsed membrane can be pulled out of the shaped cavity without difficulty.

Quantity-control of the hardenable material to be poured into the mold cavity can be effected by either regulating the quantity or regulating the pressure. When using "Quantity-control" a predetermined amount of the hardenable material to be poured is introduced into the die cavity by a dosing device (quantity regulator), while simultaneously, by an additional quantity regulator, an identical amount of liquid is withdrawn from the interior of the membrane.

It is difficult in this case, however, to achieve the exact amounts of the two quantities, because operating pumps and quantity regulators which are very precise have to be used.

Therefore, it is practical to maintain a certain amount of positive pressure in the liquid which fills the membrane in order to expand the membrane to the volume of the die cavity. Now, if the hardenable material to be poured is introduced under a positive or greater pressure with respect to the membrane inner pressure, then the membrane is compressed to an exactly defined volume while a certain quantity of liquid is displaced, i.e. the right amount of hardenable material can enter into the die-cavity. In this manner, the quantity of material required for producing the shaped body that will enter the die cavity is assured.

As an alternative to the form of construction wherein the membrane forms the core, there may be employed a conventional metal core whose outer surface is surrounded by a deformable membrane. The deformable membrane is expanded before the filling with the material, as explained above, to displace the air from the die cavity. During the introduction of the hardenable material, the membrane is compressed while the fluid medium contained in it, for example a gas or liquid, is displaced. The membrane follows the contour of the outer surface of the metal core contacting it, which outer surface corresponds to the inner-contour of the shaped body to be produced. In this form of construction, a suitably split metal core is used to facilitate removal of the core from the mold.

This process is particularly useful for the production of casings for air tires, where it is important that substantially no bubbles are present in the casing. Tires can be produced by the so-called "Injection-process" i.e. a process where the casing and the contact area are produced simultaneously.

In this case, the membrane cannot completely fill the die-cavity in the region of the wear area profile, so that some air remains there. However, the bubbles caused by this remaining air are mostly in the region of the running surface where they are less detrimental than in the region of the casing.

In the following, the invention is explained in detail with the aid of example embodiments and reference to the enclosed schematic drawings.

As shown in FIG. 1, in the device according to the invention, a conventional mold 10 is used, which consists of several elements which are not shown in detail. After completion of the pouring process certain parts can be taken out of the mold in order to remove the finished formed body from the mold.

A high pressure mixer head 12 is attached to the mold where the components designated A and B, are mixed, and the mixture introduced into the mold cavity 14. The components A and B may be the well known polyurethane components containing as primary constituents a polyol which may be a polyether or a polyester, and an isocyanate to produce the well known polyurethanes.

A deformable membrane 16 is schematically indicated in several positions designated by the numerals 1, 2 and 3, in the mold cavity (die-cavity) 14. The membrane is made of a suitable elastic material. For this purpose, rubber can be used, but an elastomer can also be used, as for example polyurethane, with a wall thickness of approximately 2 mm.

A membrane 16 is connected to a pipe-line 18 which contains a pressure regulator 20. The other end of line 18 is connected to a cylinder 22 in which a slidable piston is arranged.

A sensor 26 is provided to indicate the respective position of the piston 24. This sensor 26 serves for interrupting the feeding of polyurethane material to the die-cavity 14, as will be explained in the following.

The inner space of the membrane 16, the line 18, and the cylinder 22 are filled with a liquid whose specific weight equals the specific weight of the polyurethane used for producing the tire.

At the beginning of the operation to produce the tire, the piston 24 as shown in FIG. 1 is displaced to the left in the cylinder 22, so that the liquid flows through line 18 into the membrane 16, and expands the latter to such an extent that it fills the volume of the mold cavity 14. This position of the membrane 16 is in FIG. 1 indicated by reference number 1. The pressure of the liquid in membrane 16 is above atmospheric pressure, in order to prevent air from entering into the mold cavity 14.

To facilitate escape of air from the mold cavity 14, an escape opening 28 is provided, preferably at the highest point of the cavity 14, which opening is closed after the expansion of the membrane 16 is completed.

After practically all the air in the mold-cavity 14 has been expelled, and after the escape opening 28 has been closed, the polyurethane material is introduced into the mold-cavity 14 by the high pressure mixing head 12. This feeding is effected under a pressure higher than the pressure of the liquid within membrane 16, so that this liquid is pressed out from the membrane 16, and flows through pipe line 18 and the pressure regulator 20 to the cylinder 22. Thereby, the piston 24 in cylinder 22 is moved a certain distance, which distance is directly proportional to the contraction of the membrane, and thereby to the amount of polyurethane introduced into the mold.

A position of the piston 24 can therefore be determined, which would indicate at what point exactly the right amount of polyurethane corresponding to the air tire to be produced, has been introduced into the mold cavity 14.

If this position is determined by means of the sensor 26, the feeding of the polyurethane material to the mold cavity 14 can be interrupted after the corresponding displacement of piston 24. In FIG. 1 the corresponding form of the membrane 16 and the corresponding position of piston 24 in cylinder 22 is indicated by the reference number 2.

Hardening of the material can be initiated by adding heat either directly to the mold, and/or by heating the liquid within membrane 16.

After hardening, the piston 24 is further moved to the right as shown in FIG. 1. This causes the membrane 16 to collapse, and to assume the position indicated by reference number 3. The corresponding position of piston 24 is also indicated by reference number 3.

Now the membrane can easily be taken out of the inner space of the hardened air tire, and then the latter is removed in the conventional manner from the mold.

In this form of construction the driver unit (not shown) for the piston 24 is designed so that it can displace the piston 24 between the two positions 1 and 3, and thereby generate a pressure in the membrane 16 which expands the membrane 16 to the volume indicated by reference number 1.

Figure 2:
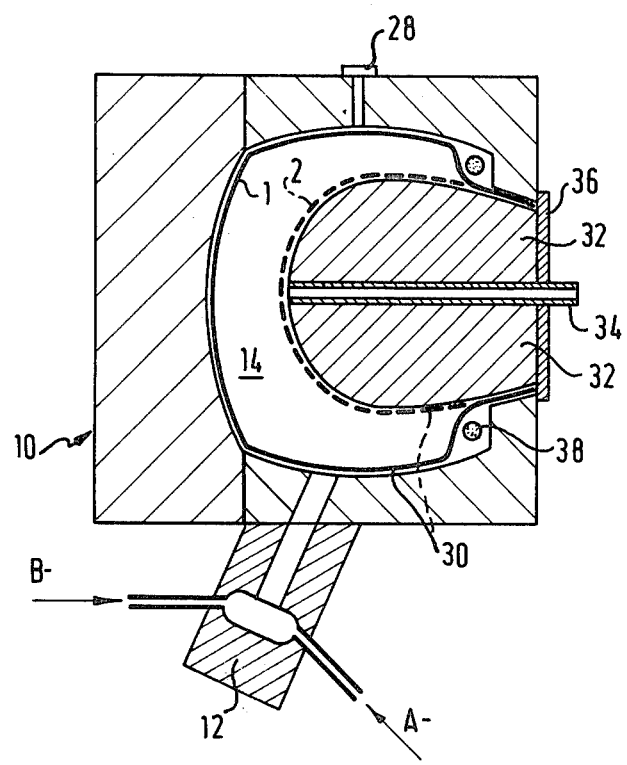
FIG. 2 diagrammatically illustrates another embodiment of the device for the production of air-tires, wherein the core is formed by a metal core and a deformable membrane.

In FIG. 2 a form of construction is shown, in which the core is made up of the membrane 30 surrounding a separate metal core 32 which is split into parts.

The filling tube 34 through which liquid medium flows extends from outside mold 10 through this metal core 32 into the mold cavity 14. The metal core 32 is sealed to the outside by the sealing plate 36, schematically shown. The purpose of said sealing plate is to avoid the escape of the fluid medium or the entrance of air.

In FIG. 2 rim-cores 38 are shown as they are used for the manufacture of polyurethane tires. Otherwise, in FIG. 2, the same construction elements can be recognized as in the construction form according to FIG. 1, so that they will not be further described in detail.

Prior to the filling operation with the hardenable and pourable material, the membrane 30 follows the contour of the outer surface of the metal core 32, and therefore has the position indicated by reference number 2. Also the cores for the rim 38 are shown inserted in the mold.

Now a fluid medium, i.e. a gas or a liquid with a predetermined positive pressure is introduced through the filling tube 34 through the metal core, so that the membrane 30 is expanded, and finally takes the position indicated by reference number 1, and thus completely fills the mold cavity 14. Sequentially thereafter the polyurethane-mixture is introduced by means of the high pressure-mixing head 12 under pressure greater than the pressure of the fluid medium, so that the membrane 16 is pressed to a smaller volume, and finally reaches position 2 again, and thus lies again at the outer surface of the metal core 32, whose form corresponds to the inner contour of the tire.

After the mold cavity 14 has been completely and substantially without bubbles, filled with polyurethane, the hardening process can begin. The heat to facilitate hardening of the polyurethane material can be applied either directly to the mold, or through the metal core 32.

After the hardening process, the metal core 32 is dis-assembled in its parts in conventional manner, so that the metal core 32 and the membrane 30 can be taken out of the mold. Finally the finished polyurethane-tire can be removed from the mold.

In this form of construction the amount of the material to be poured must be dosed very precisely to avoid bursting of the mold. Said dosing of the material to be poured can be for example effected by means of the volume of the liquid material that flows out of the membrane, whereby the feed of polyurethane material through the mixing head 12 is cut off when a certain volume is reached.

There are claimed:

1. Apparatus for production of hollow shaped bodies made of pourable and hardenable material in a mold cavity and minimizing the inclusion of air in the shaped body which comprises, a mold having a mold cavity, a core with a deformable membrane disposed in the mold cavity, said membrane normally filling only part of the mold cavity but expandable to fill the entire mold cavity, a conduit means connected to a source of a liquid medium and leading to the deformable membrane for the introduction of the liquid medium under superatmospheric pressure which liquid expands the membrane to a volume that substantially fills the mold cavity to include the space into which the hardenable material will be poured to form the hollow shaped body and expels gas contained therein, the mold cavity having an opening formed therein, pressure means through said opening for the introduction of hardenable material corresponding to the amount of material required to produce the shaped body at a superatmospheric pressure above the pressure of the liquid in the membrane to effect contraction of the membrane to the form of the core, and a piston-cylinder unit connected to said conduit means for the transfer of said liquid medium into and out of said mold cavity.

2. Apparatus according to claim 1, wherein a pressure regulator is disposed in said conduit means between said membrane and said piston-cylinder unit.

3. Apparatus according to claim 1 or claim 2, including a sensor to determine position of the piston of the piston-cylinder unit for controlling the feeding of the hardenable, pourable material.

4. Apparatus according to claim 1, wherein the membrane surrounds a metal core, and wherein a filling tube through which the liquid medium flows extends through the metal core into the membrane.

* * * * *